(12) United States Patent
Zhang et al.

(10) Patent No.: US 11,181,760 B2
(45) Date of Patent: Nov. 23, 2021

(54) LOW-LOSS WAVEGUIDING STRUCTURES, IN PARTICULAR MODULATORS

(71) Applicant: HyperLight Corporation, Cambridge, MA (US)

(72) Inventors: Mian Zhang, Cambridge, MA (US); Christian Reimer, Brookline, MA (US); Kevin Luke, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 16/924,767

(22) Filed: Jul. 9, 2020

(65) Prior Publication Data

US 2021/0011217 A1    Jan. 14, 2021

Related U.S. Application Data

(60) Provisional application No. 62/871,928, filed on Jul. 9, 2019.

(51) Int. Cl.
| | | |
|---|---|---|
| *G02F 1/035* | (2006.01) | |
| *G02B 6/122* | (2006.01) | |
| *G02F 1/225* | (2006.01) | |
| *G02F 1/01* | (2006.01) | |
| *G02B 6/28* | (2006.01) | |

(52) U.S. Cl.
CPC .......... *G02F 1/035* (2013.01); *G02B 6/1228* (2013.01); *G02F 1/225* (2013.01); *G02B 6/2813* (2013.01); *G02F 1/0118* (2013.01)

(58) Field of Classification Search
None
See application file for complete search history.

(56) References Cited

U.S. PATENT DOCUMENTS

| | | | |
|---|---|---|---|
| 5,799,119 A | 8/1998 | Rolland | |
| 6,853,793 B1 * | 2/2005 | van der Vliet | ......... G02B 6/122 |
| | | | 250/216 |
| 7,155,088 B2 | 12/2006 | Thapliya et al. | |
| 7,251,406 B2 | 7/2007 | Luo et al. | |
| 7,333,691 B1 * | 2/2008 | Gill | ........................ B82Y 20/00 |
| | | | 359/344 |
| 8,600,198 B2 | 12/2013 | Sudo et al. | |
| 9,759,982 B2 | 9/2017 | Feng et al. | |
| 9,778,417 B2 | 10/2017 | Cherchi et al. | |
| 9,939,709 B2 | 4/2018 | Iwatsuka et al. | |

(Continued)

FOREIGN PATENT DOCUMENTS

| | | |
|---|---|---|
| JP | 6476876 B2 * | 2/2019 |
| WO | 2018031916 A1 | 8/2016 |

OTHER PUBLICATIONS

Search Report from corresponding International Application No. PCT/US2020/070252, dated Oct. 22, 2020.

*Primary Examiner* — Michael Stahl
(74) *Attorney, Agent, or Firm* — Stratford Group Ltd.

(57) ABSTRACT

An optical modulator that uses adiabatic tapers to change the width of the waveguides between multimode waveguides and single mode waveguides on a low-loss, e.g. thin-film lithium niobate, electro-optic platform. The architecture enables the utilization of the fundamental mode of multimode wide optical waveguides that have lower optical propagation loss without sacrificing the benefit of the signal integrity and ease of control of single mode operation.

20 Claims, 8 Drawing Sheets

(56) References Cited

U.S. PATENT DOCUMENTS

| | | | |
|---|---|---|---|
| 2004/0151423 A1 | 8/2004 | Izhaky et al. | |
| 2009/0142019 A1* | 6/2009 | Popovic | G02B 6/10 385/28 |
| 2011/0262071 A1 | 10/2011 | Mitomi et al. | |
| 2011/0317956 A1* | 12/2011 | Sudo | G02F 1/2257 385/2 |
| 2015/0260916 A1 | 9/2015 | Cherchi et al. | |
| 2015/0293427 A1 | 10/2015 | Goi et al. | |
| 2017/0351025 A1 | 12/2017 | Trita | |
| 2018/0211685 A1* | 7/2018 | Mehfuz | G02B 6/125 |

\* cited by examiner

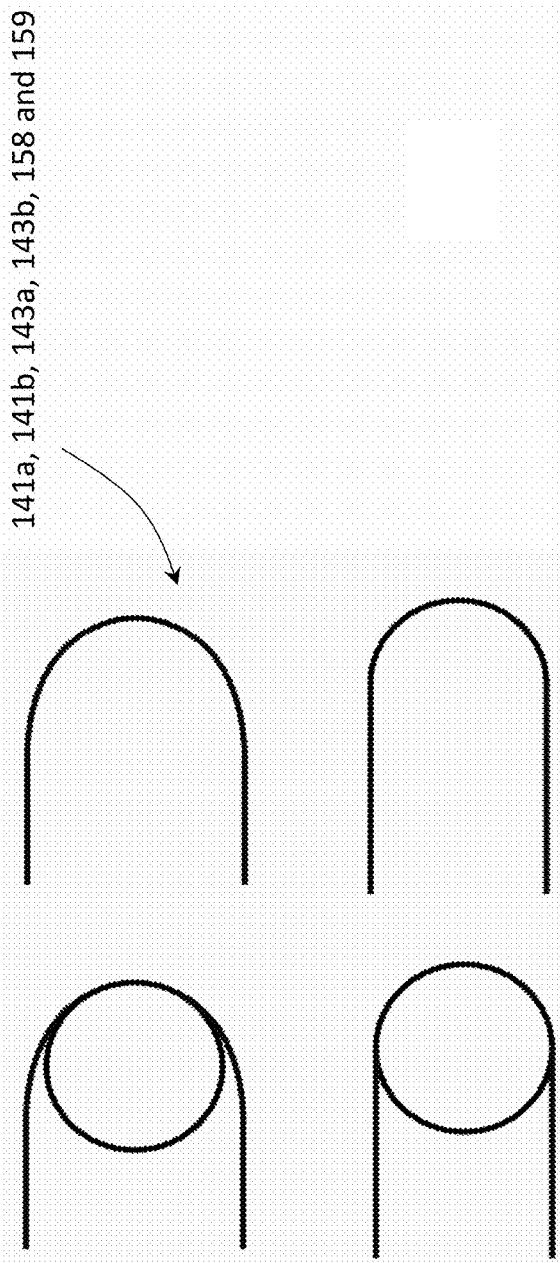

LOW-LOSS WAVEGUIDING STRUCTURES, IN PARTICULAR MODULATORS

CROSS-REFERENCE TO RELATED APPLICATIONS

This application claims priority to U.S. Provisional Application No. 62/871,928, filed Jul. 9, 2019, which is hereby incorporated by reference in its entirety.

TECHNICAL FIELD

The present invention relates to optical waveguiding structures, and in particular to hybrid optical phase shifters and modulators utilizing both narrow, e.g. single mode, and wider, e.g. multimode, waveguide sections.

BACKGROUND

Conventional integrated modulators have an active section, i.e. a portion with electrodes, that have dominant loss from absorption. Existing lithium niobate modulators based on electro-optic effect do not utilize high confinement optical modes.

An object of the present disclosure is to overcome the shortcomings of the prior art by providing a hybrid optical modulator that utilizes both narrow, e.g. single mode, and wider, e.g. multimode, optical waveguides.

SUMMARY

Accordingly, the present disclosure relates to an optical modulator comprising: an input port for launching a beam of light; a first waveguide arm for transmitting the beam of light; a first set of electrodes configured to modulate the beam of light; and an output port for outputting a modulated output beam; wherein the first waveguide arm comprises first single mode waveguide sections and a first multimode waveguide section, and wherein at least a portion of the first multimode waveguide sections is disposed adjacent to the first set of electrodes.

BRIEF DESCRIPTION OF THE DRAWINGS

The invention will be described in greater detail with reference to the accompanying drawings which represent preferred embodiments thereof, wherein:

FIGS. 6A and 6B illustrate the curvatures of the bend sections compared to conventional bend sections.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1A:
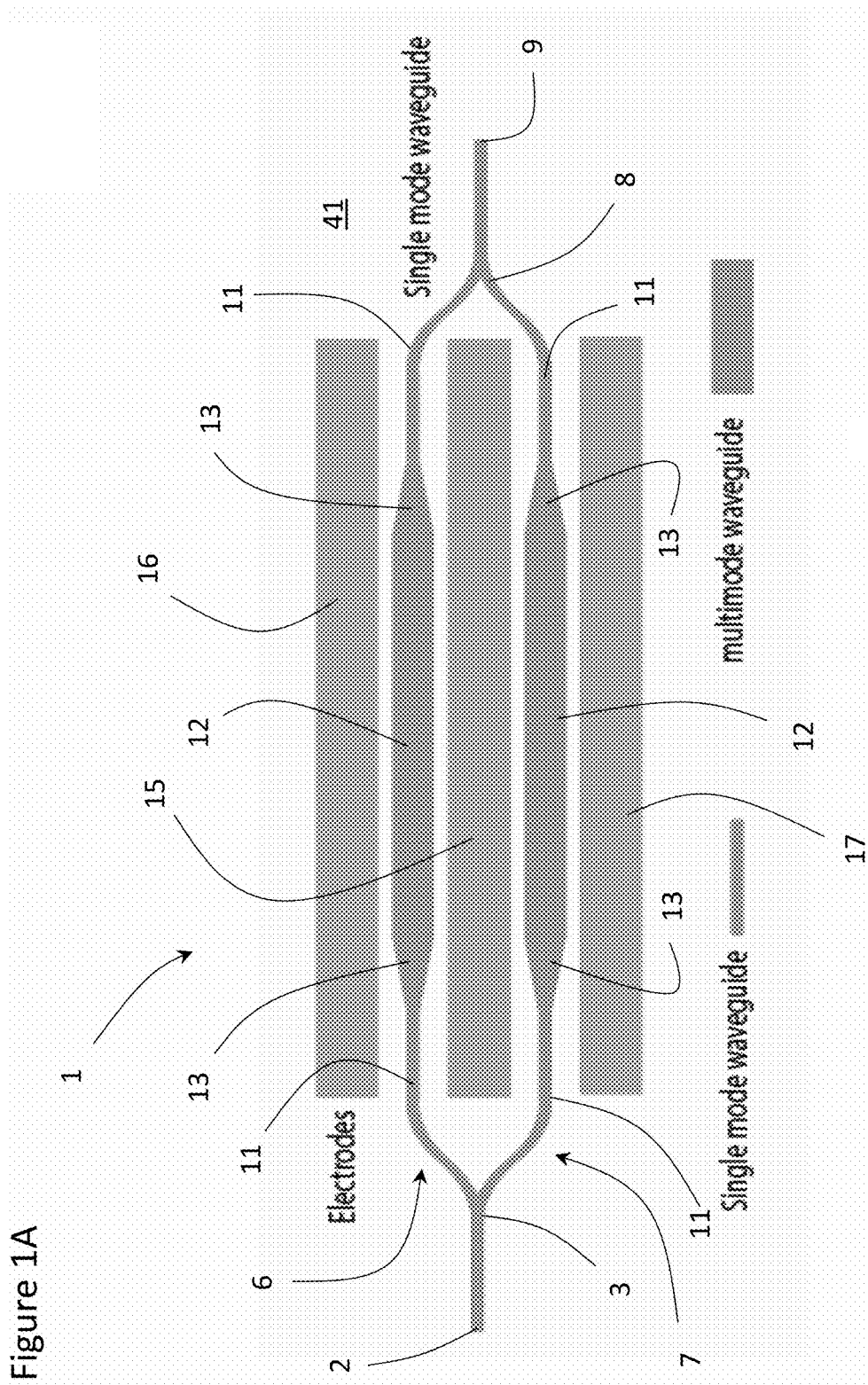
FIG. 1A is a schematic of an electro-optic modulator with tapered waveguide section to reduce optical loss.
Figure 1B:
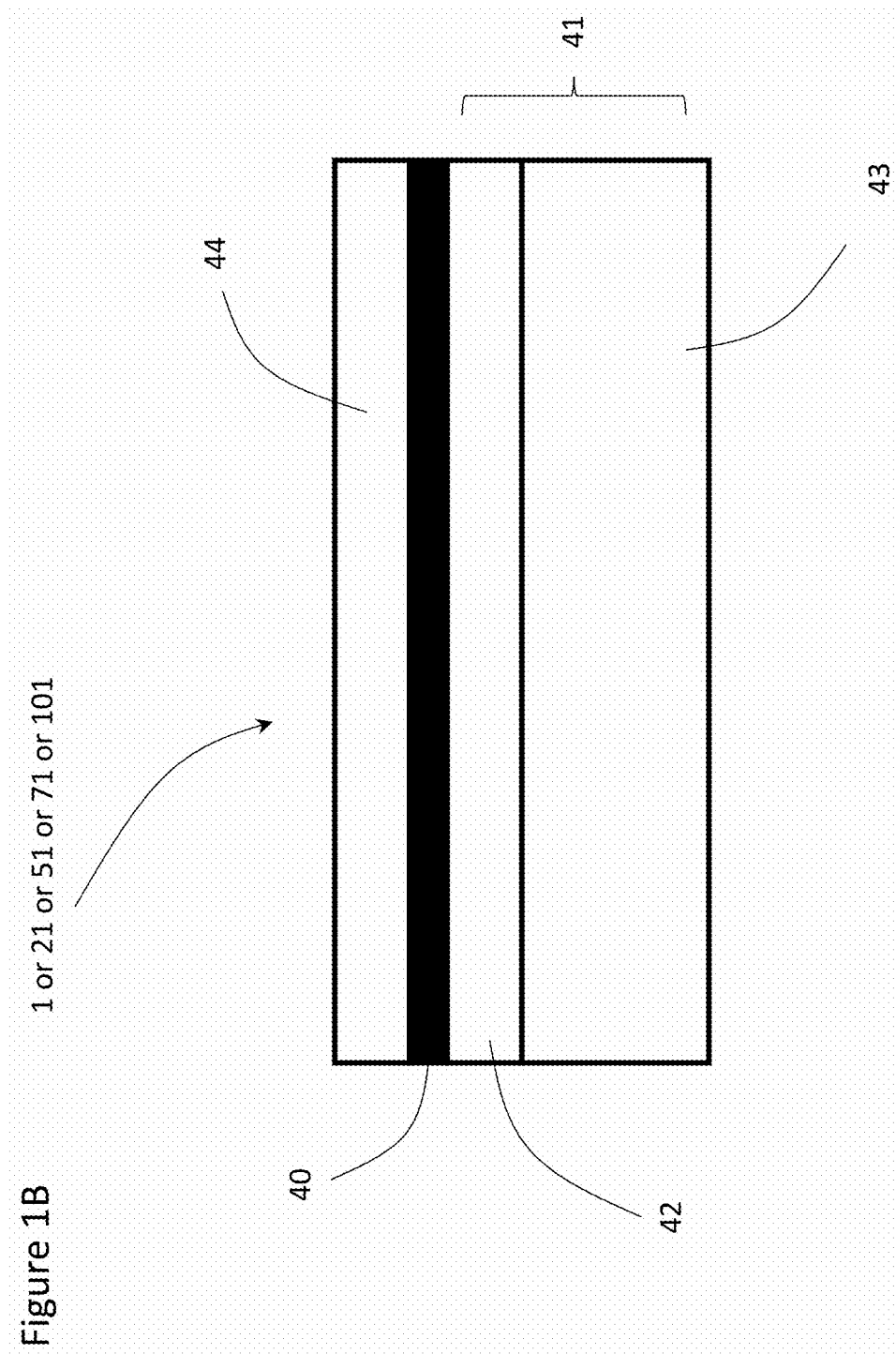
FIG. 1B is a cross-sectional view of the electro-optic modulator of FIG. 1A.

With reference to FIGS. 1A and 1B, an electro-optic intensity modulator 1, includes an input waveguide or port 2 optically coupled to a first coupler 3, e.g. a Y-splitter or 2×2 coupler, for splitting an input optical signal into first and second sub-beams, which propagate along first and second arms 6 and 7, and a second coupler 8, e.g. a Y-splitter, for recombining, e.g. interfering, the first and second sub-beams for output an output waveguide or port 9. Each of the first and second arms 6 and 7 may comprise both narrower, e.g. single mode, waveguide sections 11, e.g. 400 nm to 1000 nm wide, and/or 200 nm to 1500 nm thick, and/or with a cross sectional area <3 µm$^2$, preferably less than 1 µm$^2$, and wider, e.g. multimode, waveguide sections 12, e.g. 1000 nm to 4000 nm wide, and/or 200 nm to 1500 nm thick, and/or a cross sectional area of preferably >0.2 µm$^2$ and/or <10 µm$^2$. Ideally, the narrower waveguide sections 11 may only support one TE mode and one TM mode, e.g. with optical propagation loss <0.6 dB/cm for fundamental TE$_o$ and TM$_o$ modes, and e.g. with optical propagation loss >1 dB/cm for higher order TE and TM modes. The wider waveguide sections 12 support more than one TE mode and more than one TM mode with optical propagation loss <0.6 dB/cm for all modes; however, ideally only the fundamental TM and TE modes are excited. The wider waveguide sections 12 reduce optical propagation loss from scattering from waveguide surfaces, and absorption loss from waveguide surfaces and surrounding cladding materials, when compared to the narrower waveguide sections 11. Accordingly, the narrower, e.g. single mode, waveguide sections 11 may filter out higher order modes than the fundamental TE$_o$ and TM$_o$ modes.

The narrower waveguide sections 11 may include non-trivial guiding structures, such as splitters, e.g. the first and second couplers 3 and 8, bends, and multimode interferometers (MIMI). The wider waveguide sections 12 may be significantly longer than the narrower waveguide sections 11, e.g. commonly by a factor of 10 to 100, Figure not to scale. The wider waveguide sections 12 may include simple structures, e.g. a straight line and potentially shallow bends. The wider waveguide sections 12 and the narrower waveguide sections 11 may be connected with tapers 13, which may be designed such that only the fundamental mode of the wider waveguide section 12 is excited. Particular examples of such tapers would include linear tapering of the waveguide width, cubic tapering of the waveguide width or exponential tapering, as well as other nonlinear tapering methods. The tapering may be configured to be gradual enough to enable modes to be adiabatically converted from the single mode to the fundamental TE or TM mode of the wider waveguide section 12 without excessive tapering loss or excitation of optical modes other than the fundamental TE and TM mode.

The illustrated modulator 1 may comprise an X- or Y-cut Lithium Niobate (LiNbO$_3$ or LN) design including a central signal electrode 15 with outer ground electrodes 16 and 17 adjacent the outer edges of the first and second arms 6 and 7, respectively. Ideally, the central signal electrode 15 and the outer ground electrodes 16 and 17 extend along and/or adjacent to, e.g. beside, at least a portion of wider waveguide sections 12 in the first and second arms 6 and 7. Preferably, the central signal electrode 15 and the outer ground electrodes 16 and 17 extend longer than the wider waveguide sections 12 and adjacent to narrower waveguide sections 11 in the first and second arms 6 and 7. However, a Z-cut LN design with the signal electrode 15 and one of the ground electrodes 16 over top of the first and second arms 6 and 7, respectively, or any other waveguide material, e.g. silicon, and electrode control for transmitting an electronic modulation signal to the first and second sub-beams of the input optical signal is within the scope of the invention. The above structure may also be utilized with the signal and ground electrodes 15 and 16 on a single one of the first and second arms 6 or 7, as in a phase modulator. Preferably, the waveguides comprising the input waveguide or port 2, the first coupler 3, the first and second arms 6 and 7, the second coupler 8, and the output waveguide or port 9 comprise thin film lithium niobate or lithium tantalate, which may be fabricated in accordance with the methods disclosed in WO 2018/031916 filed Aug. 11, 2017 by Wang et al., which is incorporated herein by reference.

With reference to FIG. 1B, ideally, the waveguide cores, e.g. comprising the input waveguide or port 2, the first coupler 3, the first and second arms 6 and 7, the second coupler 8, and the output waveguide or port 9, of the modulator 1 and any of the modulators described herein after may be formed in an optical device layer 40 on a substrate 41, including a lower cladding layer 42 and a handle layer 43. In a preferred embodiment, the first and second arms 6 and 7 may comprise single crystal Lithium Niobate ($LiNbO_3$ or LN) or Lithium Tantalate ($LiTaO_3$ or LT), and the substrate 41 may comprise a Lithium Niobate on insulator (LNOI) structure (or Lithium Tantalate on insulator structure (LTOI)), including a silicon dioxide ($SiO_2$) lower cladding layer 42 on a silicon (Si) handle layer 43. However, other suitable waveguide materials exhibiting anisotropy in their dielectric properties, e.g. an electro-optic material with an electro-optic constant>10 pm/V, such as gallium arsenide (GaAs), indium phosphide (InP) and barium titanate (BTO, $BaTiO_3$), are also within the scope of the invention. Note that the handle layer 43 may be other materials, such as quartz, sapphire, fused silica. The lower cladding layer 42 may be any planarized material that has a lower refractive index than the waveguide, e.g. LN or LT, material, including air (suspended structures). An upper cladding layer 44 with a lower refractive index than the waveguide, e.g. LN or LT, material, e.g. an upper $SiO_2$, may also be provided covering the modulator structure, i.e. first and second arms 6 and 7, and the first and second couplers 3 and 8.

Figure 2:
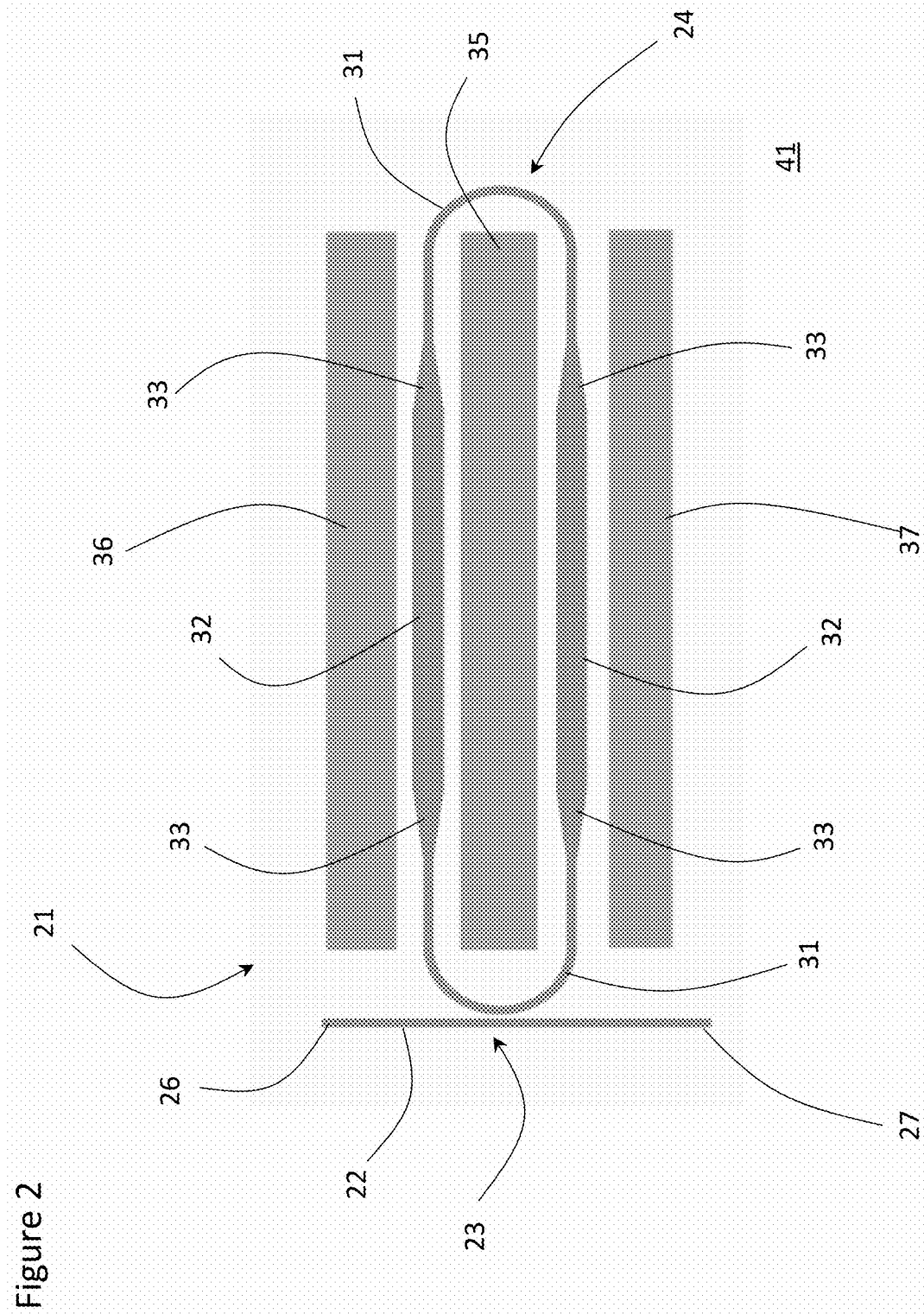
FIG. 2 is a schematic of a resonator with tapered transition to low-loss waveguide sections.

With reference to FIG. 2, the above described innovation of using adiabatic tapers to excite the low-loss fundamental mode in multimode optical waveguides is applicable to multiple different devices and geometries, where optical propagation loss is an important factor. In particular, a ring resonator 21, e.g. an elongated racetrack or loop resonator, comprising a bus waveguide 22, a coupler 23, and a ring or loop waveguide 24. The bus waveguide 22 includes an input port or waveguide 26 and an output port or waveguide 27 on opposite ends thereof with the coupler 23 therebetween. The coupler 23 may comprise an optical coupler, e.g. 2×2 optical coupler, for passing a first portion of the input light from the bus waveguide 22 into the ring waveguide 24 and a second portion of the input light to the output port or waveguide 27, and for passing a first portion of the light inside the ring waveguide 24 out to the bus waveguide 22 for interference with the second portion of the input light and for output the output port or waveguide 27, e.g. for use as a filter or modulator for outputting a modulated output beam of light. An additional bus waveguide may be provided at the opposite side of the ring waveguide 24 providing an additional output or drop port, if required, e.g. for monitoring.

The ring waveguide 24 may include long substantially straight or less curved sections, at least some of which comprise wider, e.g. multimode, waveguide sections 32 for low loss, and bend or curved sections, at least some of which comprise narrower, e.g. single mode, waveguide sections 31 to avoid mode coupling in the bends. The narrower waveguide sections 31 may include waveguide sections proximate the coupler 23 and waveguide sections on the far side of the ring waveguide 24 including the U-shaped bend between two elongated wider waveguide sections 32. The wider waveguide sections 32 and the narrower waveguide sections 31 are connected with tapers 33, as hereinbefore described with reference to tapers 13, which may be designed such that only the fundamental mode, e.g. $TE_0$ and $TM_0$, of the wider waveguide section 32 is excited. Each of the bus waveguide 22, the coupler 23 and the ring waveguide 24 may comprise both narrower, e.g. single mode, waveguide sections 31, e.g. 400 nm to 1000 nm wide, and/or 200 nm to 1500 nm thick, and/or with a cross sectional area<3 $\mu m^2$, preferably less than 1 $\mu m^2$, and wider waveguide sections 32, e.g. 1000 nm to 4000 nm wide, and/or 200 nm to 1500 nm thick, and a cross sectional area of preferably >0.3 $\mu m^2$ and/or <10 $\mu m^2$. Ideally, the narrower waveguide sections 31 may only support and maintain one fundamental $TE_0$ mode and one $TM_0$ mode with optical propagation loss<0.6 dB/cm, and with optical propagation loss>1 dB/cm for higher modes. The wider waveguide sections 32 may support more than one TE mode and more than one TM mode with optical propagation loss<0.6 dB/cm for all modes; however, ideally only the fundamental $TM_0$ and $TE_0$ modes are excited. The wider waveguide sections 32 reduce optical propagation loss from scattering from waveguide surfaces, and absorption loss from waveguide surfaces and surrounding cladding materials, when compared to the narrower waveguide sections 31. The narrower, e.g. single mode, waveguide sections 31 filter out higher order mode resonances.

Particular examples of the tapers 33 would include linear tapering of the waveguide width, cubic tapering of the waveguide width or exponential tapering of the waveguide width, as well as other nonlinear tapering methods. The tapering may be configured to be gradual enough to enable modes to be adiabatically converted from the single mode to the fundamental TE or TM mode of the multimode waveguide sections 32 without excessive tapering loss or excitation of optical modes other than the fundamental TE and TM modes.

The illustrated ring resonator 21 may comprise an X- or Y-cut LN design including a central signal electrode 35 with outer ground electrodes 36 and 37 adjacent the outer edges of the wider waveguide sections 32. Ideally, the central signal electrode 35 and the outer ground electrodes 36 and 37 extend along and/or adjacent to, e.g. beside, at least a portion of the first and second wider waveguide sections 32 in the ring waveguide 24. Preferably, the central signal electrode 15 and the outer ground electrodes 16 and 17 extend longer than the first and second wider waveguide sections 32 and adjacent to narrower waveguide sections 31 in the ring waveguide 24. However, a Z-cut design with the signal electrode 35 and one of the ground electrodes 36 over top of one of the wider waveguide sections 32, or any other waveguide material, e.g. silicon, and electrode structure and control for transmitting an electronic modulation signal to the optical signal is within the scope of the invention. Preferably, the waveguides comprising the bus waveguide 22, the coupler 23, the ring waveguide 24 comprise thin film lithium niobate or lithium tantalite, which may be fabricated in accordance with the methods disclosed in WO 2018/031916 filed Aug. 11, 2017 by Wang et al., which is incorporated herein by reference.

Ideally, the waveguide cores comprising the bus waveguide 22, the coupler 23, the ring waveguide 24 of the ring resonator 21 may be formed in the optical device layer 40 on a substrate 41, from FIG. 1A, including the lower cladding layer 42 and a handle layer 43. In a preferred embodiment, the bus waveguide 22, the coupler 23 and the ring waveguide 24 are comprise single crystal Lithium Niobate ($LiNbO_3$ or LN), and the substrate 41 comprise a Lithium Niobate on insulator (LNOI) or Lithium Tantalate on insulator (LTOI) structure, including a lower cladding layer 42, e.g. a dielectric or oxide layer such as silicon dioxide ($SiO_2$), on the handle layer 43, e.g. a semiconductor like silicon (Si) or other suitable material. However, other suitable waveguide materials exhibiting anisotropy in their dielectric properties, e.g. an electro-optic material with an electro-optic constant>10 pm/V, such as gallium arsenide (GaAs), indium phosphide (InP) and barium titanate (BTO, $BaTiO_3$), are also within the scope of the invention. Note that the handle layer 43 may be other materials such as quartz, sapphire, fused silica. The lower cladding layer 42 may be any planarized material that has a lower refractive index than LN, including air (suspended structures). An upper cladding layer 44, with lower refractive index than LN, e.g. an upper dielectric or oxide layer such as $SiO_2$, may also be provided covering the modulator structure, i.e. the bus waveguide 22, the coupler 23, and the ring waveguide 24.

Figure 3A:
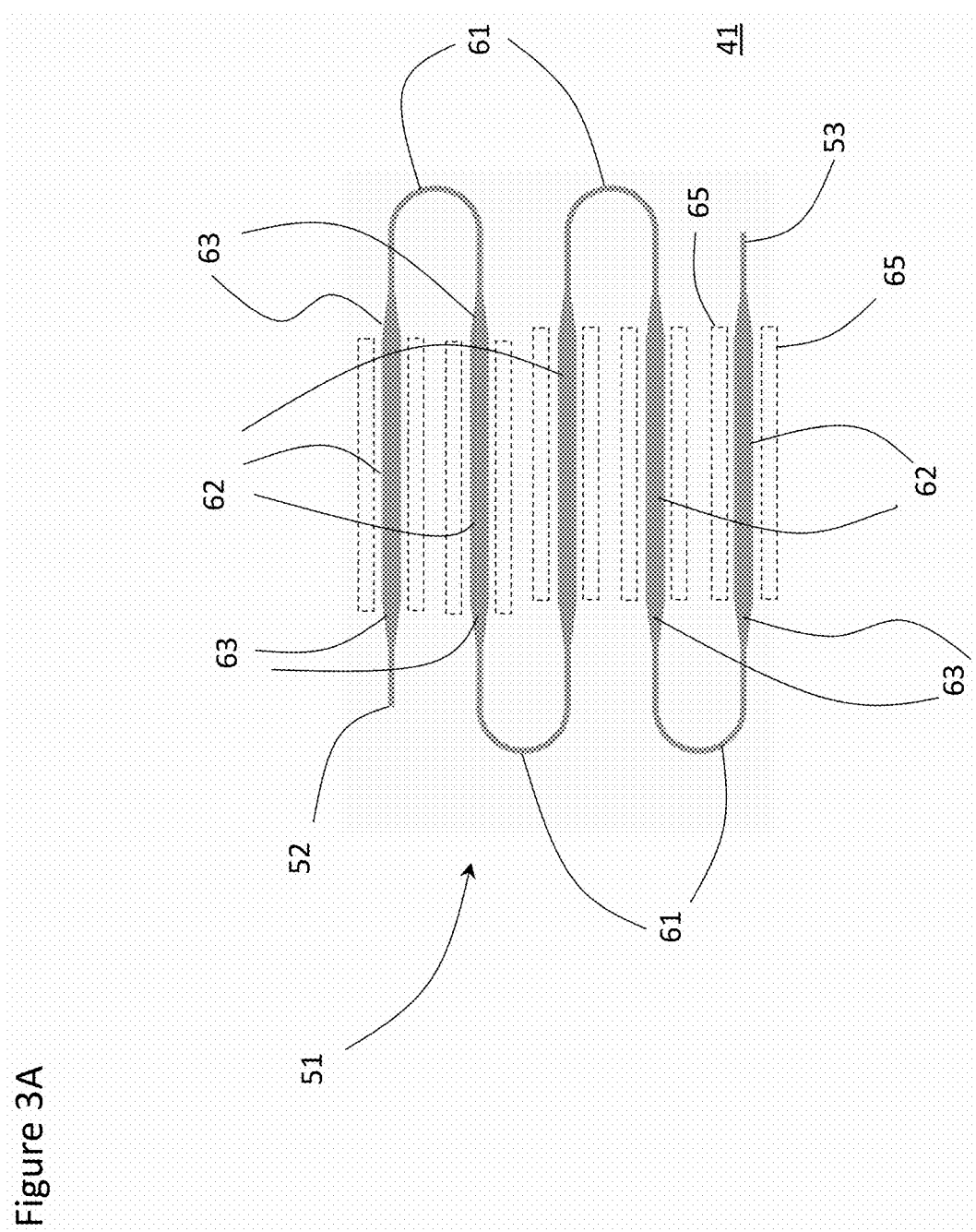
FIGS. 3A and 3B are schematics of an optical delay line, comprising bends formed by narrower, single-mode waveguides, and long straight sections formed by low-loss wider multimode waveguides.
Figure 3B:
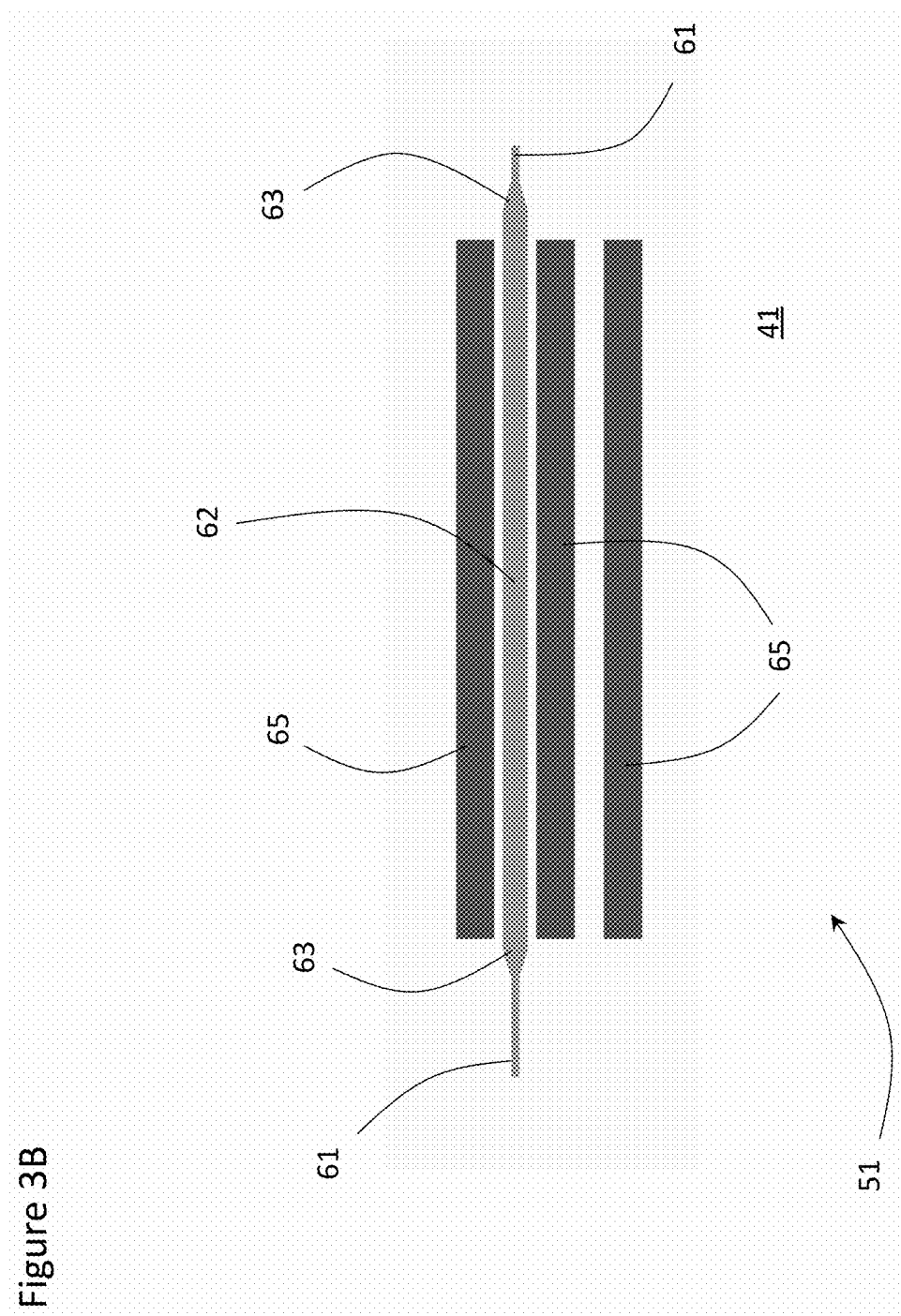

With reference to FIGS. 3A and 3B, another broader application includes an integrated optical delay line structure 51 comprising an input port 52, an output port 53, a plurality of bent sections comprising narrower, e.g. single mode, waveguide sections 61 to avoid mode coupling in the bends, and a plurality of long straight sections comprising wider, e.g. multimode, waveguide sections 62 for low loss. To minimize size, at least one and ideally all of the straight wider waveguide sections 62 are disposed parallel to each other in an array, with the bent narrower, e.g. single mode, waveguide sections 61, e.g. one or more curved sections with about a resulting 180° bend, extending between each wider straight waveguide section 62. As above, the wider waveguide sections 62 and the narrower sections 61 are connected with inverse tapers 63, as described hereinbefore with reference to tapers 13 and 33, which may be designed and configured such that only the fundamental mode of each of the wider waveguide section 62 is excited. Particular examples of such tapers 63 would include linear tapering of the waveguide width, cubic tapering of the waveguide width or exponential tapering, as well as other nonlinear tapering methods. The tapering may be configured to be gradual enough to enable modes to be adiabatically converted from the narrower sections 61 to the fundamental TE or TM mode of the wider waveguide section 62 without excessive tapering loss.

The optical delay line structure 51 may be incorporated into any optical component, e.g. phase modulator/tuner, interferometer, intensity modulator etc., and be fabricated on any waveguide structure, as hereinbefore discussed. Electrodes 65, e.g. ground and RF signal or bias, e.g. thermal, (phantom outline in FIG. 3A) may be provided adjacent to one or more of the wide waveguide sections 62 for phase modulating or biasing light propagating along the integrated optical delay line structure 51 in accordance with a phase modulating RF signal from an RF source or a bias signal from a controller. Ideally, the electrodes 65, e.g. hot and ground, extend along and/or adjacent to, e.g. beside, at least a portion of the wider waveguide sections 62. Preferably, the electrodes 65 extend longer than the wider waveguide sections 62 and adjacent to narrower waveguide sections 61.

The electrodes 65 in each set may extend parallel to each other, and each set of electrodes 65 may extend parallel to each of the other sets, and the wider waveguide sections 62 to provide a compact arrangement. The phase modulators may be driven by a common RF source, which may be split N ways where N is the number of phase modulators employed. The direction of the microwave driving field, may be the same direction as light propagation. Preferably, the waveguides comprising the optical delay line structure 51 comprise thin film lithium niobate or lithium tantalite, which may be fabricated in accordance with the methods disclosed in WO 2018/031916 filed Aug. 11, 2017 by Wang et al. The optical delay line structure 51 may comprise both the narrower waveguide sections 61, e.g. 400 nm to 1000 nm wide, and/or 200 nm to 1500 nm thick, and/or with a cross sectional area<3 $\mu m^2$, preferably less than 1 $\mu m^2$, and the wider waveguide sections 62, e.g. 1000 nm to 4000 nm wide, and/or 200 nm to 1500 nm thick, and/or a cross sectional area of preferably >0.3 $\mu m^2$ and <10 $\mu m^2$. Ideally, the narrower waveguide sections 61 may only support one TE mode and one TM mode, e.g. with optical propagation loss<0.6 dB/cm for fundamental $TE_o$ and $TM_o$ modes, and with optical propagation loss>1 dB/cm for higher TE and TM modes. The wider waveguide sections 62 may support more than one TE mode and more than one TM mode with optical propagation loss<0.6 dB/cm for all modes; however, ideally only the fundamental modes are excited.

Figure 4:
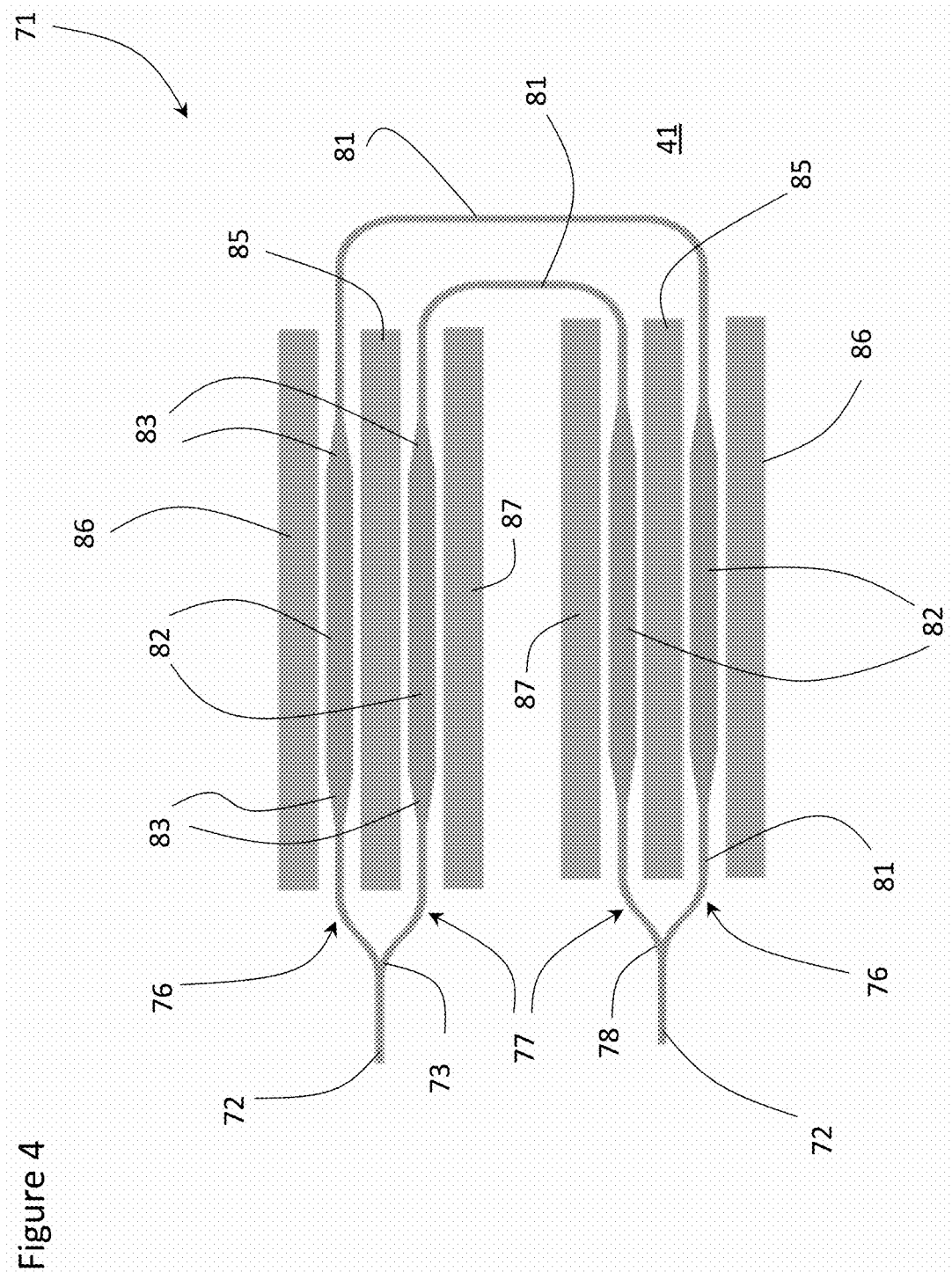
FIG. 4 is a schematic of a folded intensity modulator, where the bends are achieved with narrower, single-mode waveguides, and the straight sections employ low-loss wider multimode waveguides.

With reference to FIG. 4, an electro-optic intensity modulator 71, includes an input waveguide or port 72 optically coupled to a first coupler 73, e.g. a Y-splitter or 2×2 coupler, for splitting an input optical signal into first and second sub-beams, which propagate along first and second arms 76 and 77, and a second coupler 78, e.g. a Y-splitter, for recombining, e.g. interfering, the first and second sub-beams for output an output waveguide or port 79. Each of the first and second arms 76 and 77 comprise both narrower, e.g. single mode, waveguide sections 81 and wider, e.g. multi-mode, waveguide sections 82. The narrower waveguide sections 81 may include non-trivial guiding structures, such as splitters, e.g. the first and second couplers 73 and 78, and bends. The wider waveguide sections 82 may be significantly longer than the narrower waveguide sections 81, e.g. commonly by a factor of 10 to 100, Figure not to scale. The wider waveguide sections 82 may include only simple structures, e.g. a straight line and potentially shallow bends. The wider waveguide sections 82 and the narrower waveguide sections 81 are connected with inverse tapers 83, which may be configured such that only the fundamental mode of the wider waveguide sections 82 is excited, as defined hereinbefore with reference to tapers 13, 33 and 63. Particular examples of such tapers 83 would include linear tapering of the waveguide width, cubic tapering of the waveguide width or exponential tapering, as well as other nonlinear tapering methods. The tapering may be configured to be gradual enough to enable modes to be adiabatically converted from the single mode in the narrower waveguide sections 81 to the fundamental TE or TM mode of the wider waveguide sections 82 without excessive tapering loss. Each of the first and second arms 76 and 77 may comprise both narrower, e.g. single mode, waveguide sections 81, e.g. 400 nm to 1000 nm wide, and/or 200 nm to 1500 nm thick, and/or with a cross sectional area<3 $\mu m^2$, preferably less than 1 µm², and wider, e.g. multimode, waveguide sections 82, e.g. 1000 nm to 4000 nm wide, and/or 200 nm to 1000 nm thick, and/or with a cross sectional area of >preferably >0.3 µm² and <10 m². Ideally, the narrower waveguide sections 81 may only support one TE mode and one TM mode, e.g. with optical propagation loss<0.6 dB/cm for the fundamental $TE_0$ and $TM_0$ modes, and with optical propagation loss>1 dB/cm for higher modes. The wider waveguide sections 82 may support more than one TE mode and more than one TM mode with optical propagation loss<0.6 dB/cm for all modes; however, ideally only the fundamental $TE_0$ and $TM_0$ modes are excited. The wider waveguide sections 82 may reduce optical propagation loss from scattering from waveguide surfaces, and absorption loss from waveguide surfaces and surrounding cladding materials, when compared to the narrower waveguide sections 81. The narrower waveguide sections 81 may filter out higher order mode resonances.

Each of the first and second arms 76 and 77 includes a plurality of modulator sections, e.g. two illustrated, comprising a plurality of the wider, e.g. multimode, waveguide sections 82 that are combined together, with narrower, e.g. single mode, bend sections, e.g. one or more curved sections with about a resulting 180° bend, comprising narrower waveguide sections 81 therebetween to avoid mode coupling in the bend.

The illustrated modulator 71 comprises an X- or Y-cut Lithium Niobate ($LiNbO_3$ or LN) design including a central signal electrode 85 for each modulator section with outer ground electrodes 86 and 87 adjacent the outer edges of each wider waveguide section 82. Ideally, the central signal electrode 85 and the outer ground electrodes 86 and 87 extend along and/or adjacent to, e.g. beside, at least a portion of wider waveguide sections 82 in the first and second arms 76 and 77. Preferably, the central signal electrode 75 and the outer ground electrodes 76 and 77 extend longer than the wider waveguide sections 82 and adjacent to narrower waveguide sections 81 in the first and second arms 76 and 77. However, a Z-cut LN design with one of the signal electrodes 85 and one of the ground electrodes 86 over top of each wider waveguide sections 82, or any other waveguide design, e.g. silicon, and electrode control for transmitting an electronic modulation signal to the first and second sub-beams of the input optical signal is within the scope of the invention. Preferably, the waveguides comprising the input waveguide or port 72, the first coupler 73, the first and second arms 76 and 77, the second coupler 78, and the output waveguide or port 79 comprising thin film lithium niobate or lithium tantalite, which may be fabricated in accordance with the methods disclosed in WO 2018/031916 filed Aug. 11, 2017 by Wang et al.

Ideally, the waveguide cores comprising the input waveguide or port 72, the first coupler 73, the first and second arms 76 and 77, the second coupler 78, and the output waveguide or port 79 of the modulator 71 are formed in the optical device layer 40 on the substrate 41, including a lower cladding layer 42 and a handle layer 43. In a preferred embodiment, the first and second arms 76 and 77 comprise of single crystal Lithium Niobate ($LiNbO_3$ or LN) or Lithium Tantalate (LT), as hereinbefore described, and the substrate 41 comprising a Lithium Niobate on insulator (LNOI) or Lithium Tantalate on insulator (LTOI) structure, including a silicon dioxide ($SiO_2$) cladding layer 42 on a silicon (Si) handle layer 43. Note that the handle layer 43 may be other materials, such as quartz, sapphire, fused silica. The lower cladding layer 43 may be any planarized material that has a lower refractive index than the waveguide material, including air (suspended structures). An upper cladding layer 44 with lower refractive index than the waveguide material, e.g. an upper $SiO_2$, may also be provided covering the modulator structure, i.e. first and second arms 76 and 77, and first and second couplers 73 and 78. However, other suitable waveguide materials exhibiting anisotropy in their dielectric properties, e.g. an electro-optic material with an electro-optic constant>10 pm/V, such as gallium arsenide (GaAs) and indium phosphide (InP) and barium titanate (BTO, $BaTiO_3$), are also within the scope of the invention.

Figure 5:
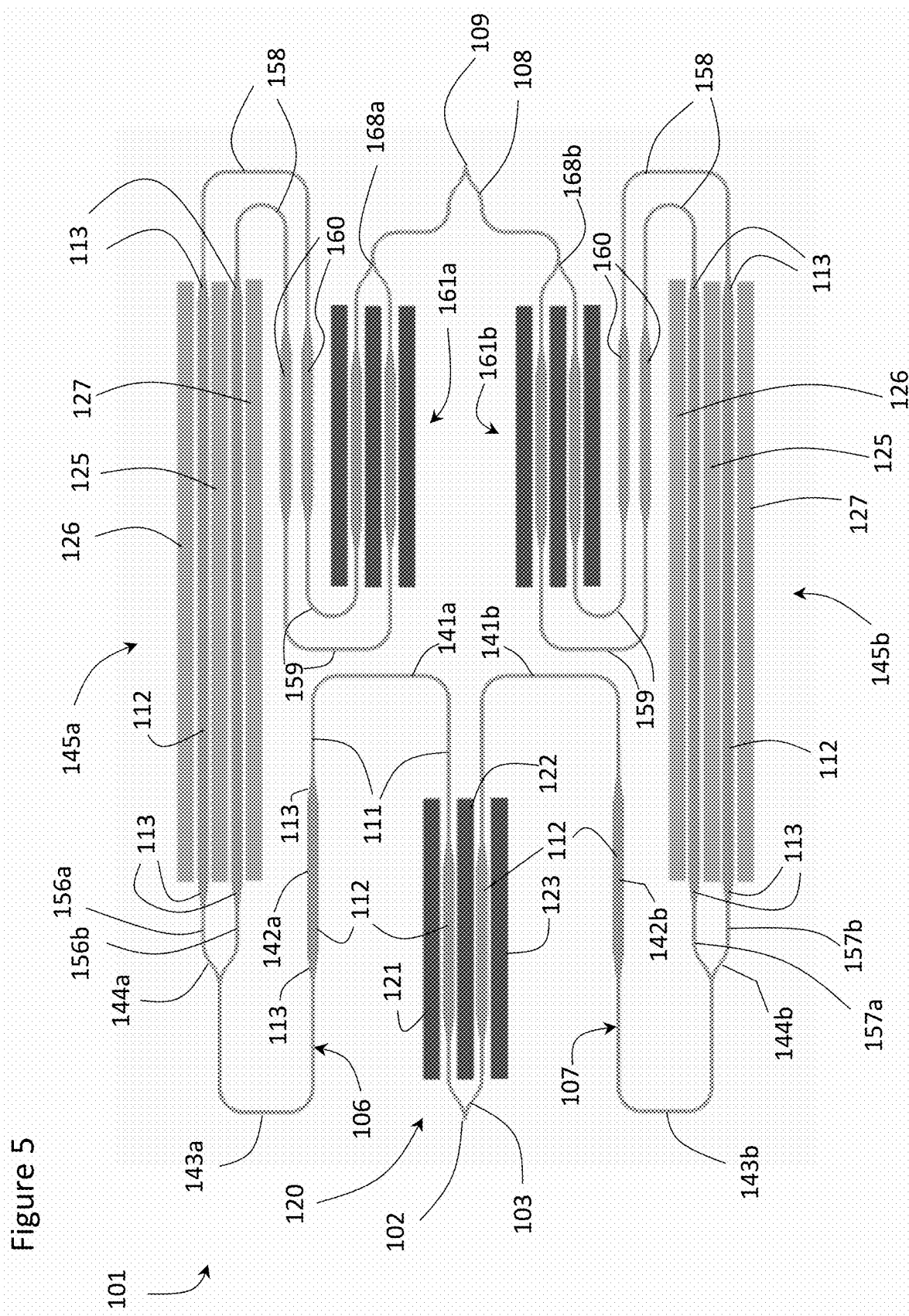
FIG. 5 is a schematic of an in-phase and quadrature (IQ) modulator, comprising multiple modulation sections.

With reference to FIG. 5, an in-phase and quadrature (IQ) optical modulator 101, may comprise multiple modulation sections. The light gray electrode sections (upper and lower) indicate high bandwidth transmission line, e.g. RF, electrodes, while the dark gray electrode sections (three middle sections) are used for low bandwidth, e.g. thermal, biasing of the device. Previous IQ modulator designs could not support sharp bending sections, and therefore require rather long electrode sections. The arms 106 and 107 of the interferometer may be completely balanced (same length) with this design.

The IQ modulator 101 includes: an input port or waveguide 102 optically coupled to a input coupler 103, e.g. a Y-splitter, for splitting an input optical signal into first and second beams (I and Q signals), which propagate along first and second arms 106 and 107, respectively; and an output coupler 108, e.g. a Y-splitter or 2×2 coupler, for recombining the first and second beams for output an output waveguide or port 109. Each of the first and second arms 106 and 107 comprise both narrower, e.g. single mode, waveguide sections 111 and wider, e.g. multimode, waveguide sections 112. The narrower waveguide sections 111 may include non-trivial guiding structures, such as splitters, e.g. the first and second couplers 103 and 108, and bends. The first and second arms 106 and 107 are folded back a plurality of times, whereby a plurality, if not all, of the wider waveguide sections 112 extend parallel to each other, to reduce the footprint of the IQ modulator 101. Each bend, e.g. one or more curved sections with about a resulting 180° bend, may comprise one of the narrower waveguide section 111, while each straight section may include or comprise one or more low-loss wider waveguide sections 112. Adiabatic tapers 113 are used to expand the narrower waveguide sections 111 into the wider waveguide sections 112, and to excite the fundamental mode of the low-loss wider waveguide sections_112. The adiabatic tapers 113 are also provided configured to taper the wider waveguide sections 112 down to the narrower waveguide sections 111. The wider waveguide sections 112 may be significantly longer than the narrower waveguide sections 111, e.g. commonly by a factor of 10 to 100, FIG. 5 is not to scale. The wider waveguide sections 112 may include only simple structures, e.g. a straight line and potentially shallow bends. The wider waveguide sections 112 and the narrower waveguide sections 111 are connected with the inverse tapers 113, which may be configured such that only the fundamental mode of the wider waveguide section 112 is excited. Particular examples of such taper 113 would include linear tapering of the waveguide width, cubic tapering of the waveguide width or exponential tapering, as well as other nonlinear tapering methods, as hereinbefore described with reference to tapers 13, 33, 63 and 83. The tapering may be configured to be gradual enough to enable modes to be adiabatically converted from the single mode in the narrower waveguide sections 111 to the fundamental TE or TM mode of the wider waveguide section 112 without excessive tapering loss. Each of the first and second arms 106 and 107 may comprise both narrower waveguide sections 111, e.g. 400 nm to 1000 nm wide, and/or 400 nm to 1500 nm thick, and/or with a cross sectional area<3 µm², preferably less than 1 µm², and wider waveguide sections 112, e.g. 1000 nm to 4000 nm wide and a cross sectional area of preferably >0.3 µm² and <10 µm². Ideally, the narrower waveguide sections 111 may only support one TE mode and one TM mode, e.g. with optical propagation loss<0.6 dB/cm for the fundamental $TE_0$ and $TM_0$ modes, and with optical propagation loss>1 dB/cm for higher TE and TM modes. The wider waveguide sections 112 support more than one TE mode and more than one TM mode with optical propagation loss<0.6 dB/cm for all modes; however, ideally only the fundamental modes are excited. The wider waveguide sections 112 reduce optical propagation loss from scattering from waveguide surfaces, and absorption loss from waveguide surfaces and surrounding cladding materials, when compared to single mode waveguide sections. The narrower waveguide sections 111 may filter out higher order mode resonances.

The first and second arms 106 and 107 may both pass through a first low-bandwidth biasing (phase) section 120 including a wider, e.g. multimode, waveguide section 112 from each of the first and second arms 106 and 107 adjacent to DC electrodes 121, 122 and 123 for adjusting the bias, e.g. phase, of the I and Q signals, e.g. quasi-statically thermal biasing. Each of the first and second arms 106 and 107 may include a first narrower, e.g. single-mode, bend section 141a and 141b, respectively, to direct the first and second arms 106 and 107 in opposite directions and then fold each of the first and second arms 106 and 107 back to wider, e.g. multimode, spacer sections 142a and 142b, which are passive wider waveguide sections, i.e. absent any electrodes, configured to reduce loss in long waveguide sections. Each of the first and second arms 106 and 107 may include a second narrower, e.g. single-mode, bend section 143a and 143b, respectively, for folding each of the first and second arms 106 and 107 back to an interim optical splitter 144a and 144b for splitting each of the first and second beams into respective first and second sub-beams for transmission along first and second interim arms 156a, 156a, 157b and 157b to respective optical modulator sections 145a and 145b. The first and second interim arms 156a, 156a, 157b and 157b are expanded via adiabatic tapers 113 to wider, e.g. multimode, waveguide sections 112 within the optical modulator sections 145a and 145b, and then reduced in size via adiabatic tapers 113 when exiting the optical modulator sections 145a and 145b to the narrower waveguide sections 111.

Each of the first and second interim arms 156a, 156a, 157b and 157b may include a third and a fourth narrower, e.g. single-mode, bend sections 158 and 159 with a wider, e.g. multimode, spacer section 160 therebetween for winding the first and second interim arms 156a, 156a, 157b and 157b, i.e. the first and second arms 106 and 107, to a respective final biasing (phase) section 161a and 161b, similar to the biasing section 120. For example, one or both of the final phase biasing sections 161a and 161b may be configured to implement a relative phase bias between the first and second modulated beams (I and Q signals), e.g. π/2 phase difference. Each of the first and second arms 106 and 107 includes an interim combiner coupler 168a and 168b for combining the respective first and second sub-beams back into first and second modulated beams (I and Q signals) for recombination in the output coupler 108 and output the output waveguide or port 109.

The illustrated modulator sections 145a and 145b may comprise an X- or Y-cut Lithium Niobate ($LiNbO_3$ or LN) design including a high-bandwidth transmission line central RF-signal electrode 125 with outer ground electrodes 126 and 127 adjacent the outer edges of each wider waveguide section 112. Ideally, the central signal electrode 125, the outer ground electrodes 126 and 127, and the DC electrodes 121-123 extend along and/or adjacent to, e.g. beside, at least a portion of the wider waveguide sections 112 in the first and second interim arms 156a, 156b, 157a and 157b. Preferably, the central signal electrode 175 and the outer ground electrodes 176 and 177 extend longer than the wider waveguide sections 112 and adjacent to narrower waveguide sections 111 in the first and second interim arms 156a, 156b, 157a and 157b. However, a Z-cut LN design with one of the signal electrodes 125 and one of the ground electrodes 126 over top of each wider waveguide sections 112, or any other waveguide design, e.g. GaAs, InP, and electrode control for transmitting an electronic modulation signal to the optical signals is within the scope of the invention. Preferably, the waveguides comprising the input port or waveguide 102, the first coupler 103, the first and second arms 106 and 107, the second coupler 108, and the output waveguide or port 109 may comprise thin film lithium niobate or lithium tantalite, which may be fabricated in accordance with the methods disclosed in WO 2018/031916 filed Aug. 11, 2017 by Wang et al.

Ideally, the waveguide cores comprising the input port or waveguide 102, the first coupler 103, the first and second arms 106 and 107, the second coupler 108, and the output waveguide or port 109 of the IQ modulator 101 is formed in the optical device layer 40 on the substrate 41, including a lower cladding layer 42 and a handle layer 43. In a preferred embodiment, the first and second arms 106 and 107 may comprise single crystal Lithium Niobate ($LiNbO_3$ or LN) or Lithium Tantalate (LT), and the substrate 41 may comprise a Lithium Niobate on insulator (LNOI) or Lithium Tantalate on insulator (LTOI) structure, including a silicon dioxide ($SiO_2$) lower cladding layer 42 on a silicon (Si) handle layer 43. Note that the handle layer 43 may be other materials such as quartz, sapphire, fused silica. The lower cladding layer 42 may be any planarized material that has a lower refractive index than the waveguide material, including air (suspended structures). An upper cladding layer 44, e.g. an upper $SiO_2$, with lower refractive index than the waveguide material, may also be provided covering the modulator structure, i.e. first and second arms 106 and 107, and first and second couplers 103 and 108. However, other suitable waveguide materials exhibiting anisotropy in their dielectric properties, e.g. an electro-optic material with an electro-optic constant>10 pm/V, such as gallium arsenide (GaAs) and indium phosphide (InP), are also within the scope of the invention.

With reference to FIGS. 6A and 6B, in addition to employing different waveguide widths, i.e. single mode and multimode, the bends or bend sections, e.g. 141a, 141b, 143a, 143b, 158 and 159, may be designed to have a gradual increase or decrease of curvature in 90° and 180° bends (top right) to further reduce unnecessary optical loss in these hybrid mode structures. In particular, the gradual increase in curvature may follow a Euler curve (FIG. 6A) or any other transition curve with changing bend curvature, where the curvature increases linearly from 0 to a certain value, then connecting an arc of a circle with the same curvature then connecting to another tapered curvature region to go back to a straight line. FIGS. 6A and 6B illustrate the difference between a circular bend (6B) and an ultralow loss bend (6A). The pictures on the left shows the bend with a circle to show the gradual increase of curvature.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. An optical modulator comprising:
an input port for launching a beam of light;
a first waveguide arm for transmitting at least a first portion of the beam of light, the first waveguide arm comprising first single mode waveguide sections and a first multimode waveguide section;
a first set of electrodes for modulating the beam of light;
an output port for outputting a modulated output beam of light; and
adiabatic tapers for expanding one of the first single mode waveguide sections into the first multimode waveguide section, while maintaining the beam of light in fundamental TE or TM modes, and for tapering the first multimode waveguide section down to another one of the first single mode waveguide sections,
wherein at least a portion of the first multimode waveguide section is disposed adjacent to the first set of electrodes.

2. An optical modulator comprising:
an input port for launching a beam of light
a first waveguide arm for transmitting at least a first portion of the beam of light
a first set of electrodes for modulating the beam of light
an output port for outputting a modulated output beam of light
wherein the first waveguide arm comprises first single mode waveguide sections and a first multimode waveguide section,
wherein at least a portion of the first multimode waveguide section is disposed adjacent to the first set of electrodes, and
wherein the first waveguide arm further comprises a second multimode waveguide section coupled to the first multimode waveguide section by at least one first single mode waveguide section; and
further comprising a second set of electrodes adjacent to at least a portion of the second multimode waveguide section.

3. The optical modulator according to claim 2, wherein the at least one first single mode waveguide section comprises a single-mode waveguide bend in the first waveguide arm between the first multimode waveguide section and the second multimode waveguide section.

4. The optical modulator according to claim 3, wherein the single-mode waveguide bend comprises a substantially 180° bend.

5. The optical modulator according to claim 3, wherein the single-mode waveguide bend comprises a substantially 180° Euler bend.

6. The optical modulator according to claim 1, wherein the first single mode waveguide sections and the first multimode waveguide section comprises an electro-optic material with an electro-optic constant>10 pm/V.

7. The optical modulator according to claim 1, wherein the first single mode waveguide sections and the first multimode waveguide sections comprise Lithium Niobate or Lithium Tantalate.

8. The optical modulator according to claim 1, wherein the first single mode waveguide sections comprise a cross sectional area<3 $\mu m^2$.

9. The optical modulator according to claim 1, wherein the first single mode waveguide sections comprise a cross sectional area<1 $\mu m^2$.

10. The optical modulator according to claim 1, where the first multimode waveguide section comprise a cross sectional area>0.2 $\mu m^2$ and <10 $\mu m^2$.

11. An optical modulator comprising:
an input port for launching a beam of light
a first waveguide arm for transmitting at least a first portion of the beam of light
a first set of electrodes for modulating the beam of light
an output port for outputting a modulated output beam of light
wherein the first waveguide arm comprises first single mode waveguide sections and a first multimode waveguide section,
wherein at least a portion of the first multimode waveguide section is disposed adjacent to the first set of electrodes, and
wherein the first single mode waveguide sections are configured to only support one TE mode and one TM mode with optical propagation loss<0.6 dB/cm, and optical propagation loss >1dB/cm for higher modes.

12. An optical modulator comprising:
an input port for launching a beam of light
a first waveguide arm for transmitting at least a first portion of the beam of light
a first set of electrodes for modulating the beam of light
an output port for outputting a modulated output beam of light
wherein the first waveguide arm comprises first single mode waveguide sections and a first multimode waveguide section,
wherein at least a portion of the first multimode waveguide section is disposed adjacent to the first set of electrodes, and
wherein the first multimode waveguide section supports more than one TE mode and more than one TM mode with optical propagation loss<0.6 dB/cm for both TE and TM modes.

13. The optical modulator according to claim 1, further comprising:
a splitter configured to split the beam of light into a first sub-beam and a second sub-beam;
a second waveguide arm coupled to the splitter for transmitting the second sub-beam, wherein the first waveguide arm is coupled to the splitter for transmitting the first sub-beam; and
a combiner configured for combining the first sub-beam and the second sub-beam to form the modulated output beam;
wherein the second waveguide arm comprises second single mode waveguide sections and a second multimode waveguide section; and
wherein at least a portion of the second multimode waveguide section is disposed adjacent to the first set of electrodes.

14. The optical modulator according to claim 13, wherein the first waveguide arm includes a third multimode waveguide section, and a first single mode waveguide bend between the first multimode waveguide section and the third multimode waveguide section; and
wherein the second waveguide arm includes a fourth multimode waveguide section, and a second single mode waveguide bend between the second multimode waveguide section and the fourth multimode waveguide section.

15. The optical modulator according to claim 14, further comprising:
a second set of electrodes adjacent to at least a portion of the third multimode waveguide section and a portion of the fourth multimode waveguide section.

16. An optical modulator comprising:
an input port for launching a beam of light
a first waveguide arm for transmitting at least a first portion of the beam of light
a first set of electrodes for modulating the beam of light
an output port for outputting a modulated output beam of light
a bus waveguide optically coupled to the input port at one end and to the output port at an opposite end; and
a coupler configured to split the beam of light into a first sub-beam and a second sub-beam;
wherein the first waveguide arm comprises first single mode waveguide sections and a first multimode waveguide section;
wherein at least a portion of the first multimode waveguide section is disposed adjacent to the first set of electrodes;
wherein the first waveguide arm comprises a ring resonator coupled to the coupler for transmitting the first sub-beam, and recombining the first sub-beam back into the bus waveguide;
wherein the ring resonator includes curved sections and substantially straight or less curved sections;
wherein at least a portion of some of the curved sections comprise the first single mode waveguide sections; and
wherein one of the substantially straight or less curved sections comprise the first multimode waveguide section.

17. The optical modulator according to claim 16, wherein another one of the substantially straight or less curved sections comprises a second multimode waveguide section disposed adjacent to the first set of electrodes.

18. The optical modulator according to claim 16, further comprising adiabatic tapers for expanding one of the first single mode waveguide sections into the first multimode waveguide sections, while maintaining the beam of light in fundamental TE or TM modes, and for tapering the first multimode waveguide section down to another one of the first single mode waveguide sections.

19. The optical modulator according to claim 1, wherein the first single mode waveguide sections are configured to only support one TE mode and one TM mode with optical propagation loss<0.6 dB/cm, and optical propagation loss>1dB/cm for higher modes.

20. The optical modulator according to claim 19, wherein the first multimode waveguide section supports more than one TE mode and more than one TM mode with optical propagation loss<0.6 dB/cm for both TE and TM modes.

* * * * *